United States Patent
Hibino

(10) Patent No.: US 9,944,223 B2
(45) Date of Patent: Apr. 17, 2018

(54) HEADLIGHT CONTROL APPARATUS

(71) Applicant: DENSO CORPORATION, Kariya, Aichi-pref. (JP)

(72) Inventor: Katsuhiko Hibino, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/315,558

(22) PCT Filed: Apr. 22, 2015

(86) PCT No.: PCT/JP2015/062204
§ 371 (c)(1),
(2) Date: Dec. 1, 2016

(87) PCT Pub. No.: WO2015/186448
PCT Pub. Date: Dec. 10, 2015

(65) Prior Publication Data
US 2017/0197540 A1    Jul. 13, 2017

(30) Foreign Application Priority Data

Jun. 2, 2014 (JP) ................................. 2014-113990

(51) Int. Cl.
*G06F 7/00* (2006.01)
*B60Q 1/14* (2006.01)
*B60Q 1/00* (2006.01)

(52) U.S. Cl.
CPC .......... *B60Q 1/143* (2013.01); *B60Q 1/0023* (2013.01); *B60Q 2300/14* (2013.01); *B60Q 2300/42* (2013.01); *B60Q 2300/45* (2013.01)

(58) Field of Classification Search
CPC ............................ B60Q 1/143; B60Q 1/0023
See application file for complete search history.

(56) References Cited

U.S. PATENT DOCUMENTS

| 2013/0235201 A1* | 9/2013 | Kiyohara | G06K 9/00805 348/148 |
| 2014/0355827 A1* | 12/2014 | Ogawa | G06K 9/00825 382/103 |
| 2015/0302737 A1* | 10/2015 | Geerlings | G08C 17/02 340/5.25 |

FOREIGN PATENT DOCUMENTS

| JP | H09-142199 | 6/1997 |
| JP | 2008-195295 A | 8/2008 |
| JP | 2009-149190 A | 7/2009 |
| JP | 2010-006298 A | 1/2010 |
| JP | 2010-184550 A | 8/2010 |
| JP | 2012-171485 A | 9/2012 |

* cited by examiner

*Primary Examiner* — Adam M Alharbi
(74) *Attorney, Agent, or Firm* — Knobbe, Martens, Olson & Bear, LLP

(57) ABSTRACT

A headlight control apparatus 1 that controls an illumination state of a headlight 10 that illuminates an area ahead of a vehicle includes an illuminance sensor 21 that detects luminance around the vehicle, an illumination control section 31 that switches on or off the headlight 10 in accordance with the luminance detected by the illuminance sensor 21, a forward detection sensor 22 that detects an object that is present within a predetermined distance ahead of the vehicle, and a dimming control section 32 that dims the headlight 10 when the forward detection sensor 22 detects an object after start of the vehicle.

8 Claims, 6 Drawing Sheets

HEADLIGHT CONTROL APPARATUS

TECHNICAL FIELD

The present invention relates to a headlight control apparatus.

BACKGROUND ART

As systems for assisting vehicle drivers, there has been proposed a system that switches on or off a headlight according to the luminance around the vehicle. PTL 1 below describes a vehicle headlight control system that decreases illuminance of the headlight, when the vehicle is to be parked in a specific parking area, such as a home parking area, and when there is a residential house within an illumination range of the headlight of the vehicle. This system uses, as a basis, the image information on nearby residential houses captured by a camera or the information on nearby residential houses in a map database, and a vehicle azimuth detected by an azimuth sensor to determine a positional relationship between the illumination range of the vehicle headlight and the nearby residential houses. When the nearby residential houses are present within the illumination range of the vehicle headlight, this system decreases the illuminance of the headlight.

CITATION LIST

Patent Literature

[PTL 1]
  JP-A-2010-6298

SUMMARY OF THE INVENTION

Technical Problem

The system of PTL 1 mentioned above specifies a parking area in advance, and controls the illuminance of the vehicle headlight with respect to the residential houses around the parking area whose image has been captured by the camera, or the residential houses around the parking area which are registered in the map database. However, besides the residential houses around specific parking areas, there are also residential houses that are annoyed by the illumination of headlights and are not necessarily registered in the map database. Moreover, it is difficult to reliably recognize a residential house from an image captured by the camera. Accordingly, the system of PTL 1 has a limited opportunity of decreasing the illuminance of the headlight, and still has a room for improvement in preventing annoyance caused by the illumination of the headlight.

The present invention has been made to solve the problems set forth above and has an object of providing a headlight control apparatus that can reliably control illumination of the headlight according to the conditions around the vehicle and prevent annoyance caused by the illumination of the headlight.

Solution to Problem

A headlight control apparatus as an aspect of the present invention is a headlight control apparatus that controls an illumination state of a headlight that illuminates an area ahead of a vehicle, and includes: an illuminance detecting section that detects luminance around the vehicle; an illumination control section that switches on or off the headlight according to the luminance detected by the illuminance detecting section; a forward detecting section that detects an object that is present within a predetermined distance ahead of the vehicle; and a dimming control section that dims the headlight when the forward detecting section detects an object after start of the vehicle.

By adopting such a configuration, the illuminance detecting section can detect the luminance around the vehicle, and according to the detected luminance, the illumination control section can switch on or off the headlight. When the forward detecting section has detected an object within the predetermined distance ahead of the vehicle after start of the vehicle, the dimming control section dims the headlight.

Thus, for example, if one gets in a vehicle parked in a parking area at nighttime and starts the engine, and if a shop, a private residence, or the like is found to be present ahead of the vehicle, the headlight is dimmed. Accordingly, the degree of annoyance caused by the glare from the headlight can be reliably reduced.

Moreover, a headlight control apparatus as an aspect of the present invention is a headlight control apparatus that controls an illumination state of a headlight that illuminates an area ahead of a vehicle, and includes: an illuminance detecting section that detects luminance around the vehicle; an illumination control section that switches on or off the headlight according to the luminance detected by the illuminance detecting section; a forward detecting section that detects an object that is present within a predetermined distance ahead of the vehicle; a parking area recognition section that recognizes whether the vehicle has moved to a parking area; and a dimming control section that dims the headlight when the parking area recognition section recognizes that the vehicle has moved to the parking area, and the forward detecting section has detected the object.

By adopting such a configuration, the illuminance detecting section can detect the luminance around the vehicle, and according to the detected luminance, the illumination control section can switch on or off the headlight. When the parking area recognition section recognizes that the vehicle has moved to a parking area, and the forward detecting section has detected an object within the predetermined distance ahead of the vehicle, the dimming control section dims the headlight.

Thus, for example, if the vehicle moves to the parking area at nighttime, and a shop, a private residence, or the like is found to be present ahead of the vehicle, the headlight is dimmed. Accordingly, the degree of annoyance that would be caused by the glare from the headlight can be reliably reduced.

Advantageous Effects of Invention

The present invention provides a headlight control apparatus that is capable of reliably controlling the illumination of the headlight according to the conditions around the vehicle, and preventing the annoyance that would be caused by the glare from the headlight.

DESCRIPTION OF EMBODIMENTS

Referring to the accompanying drawings, hereinafter will be described some embodiments of the present invention. For the sake of clarity, components identical with each other between the drawings are given the same reference signs as much as possible to omit duplicate description.

First Embodiment

Figure 1:
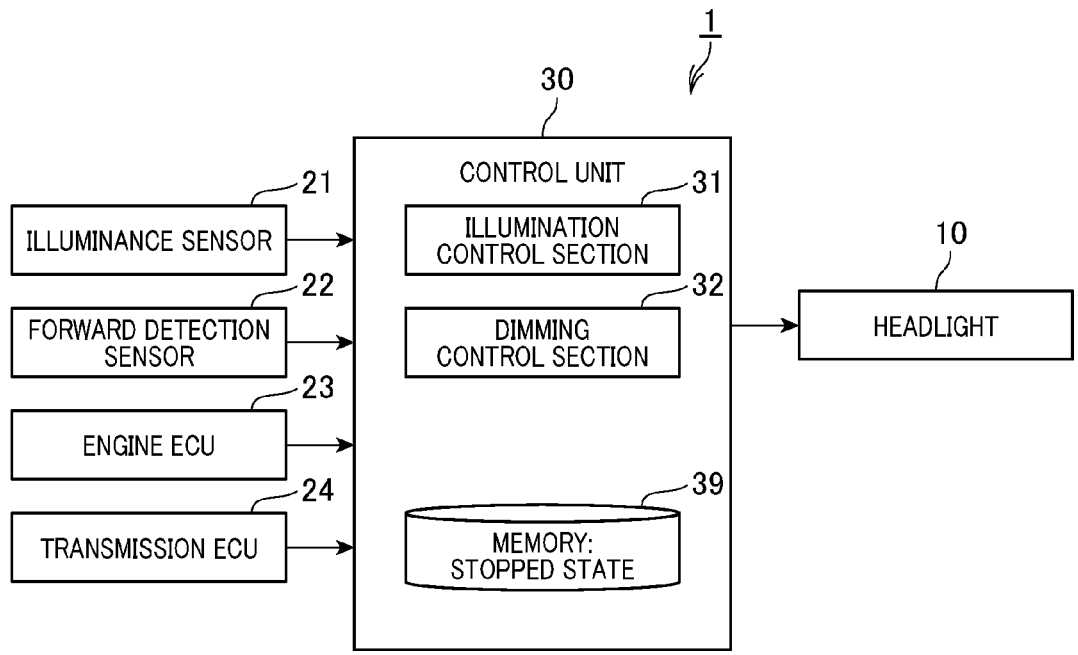
FIG. 1 is a diagram illustrating a configuration of a headlight control apparatus, according to a first embodiment of the present invention.

As shown in FIG. 1, a headlight control apparatus 1 according to a first embodiment of the present invention includes a headlight 10, an illuminance sensor (illuminance detecting section) 21, a forward detection sensor (forward detecting section) 22, an engine ECU (electronic control unit) 23, a transmission ECU 24, and a control unit 30.

The headlight 10 can be illuminated, for example, by performing switching between a low beam for illuminating a nearby area, a high beam for illuminating a far-off area, and a parking light for indicating a width of the vehicle. The headlight 10 has an automatic light control function of automatically performing switching between on and off state of the headlight 10 according to the luminance around the vehicle.

The illuminance sensor 21 detects the luminance around the vehicle. The illuminance sensor 21 adopts a photodiode, for example, as a detecting element, and is disposed on a dashboard of the vehicle, or the like.

The forward detection sensor 22 detects an object that is present ahead of the vehicle. Preferably, the forward detection sensor 22 is able to detect that an object is present within a predetermined distance D1 ahead of the vehicle, and can detect, for example, an object that is present within an illumination range of the headlight 10. Examples of the forward detection sensor 22 that can be used include radar sensors and camera sensors. The radar sensors send out an electromagnetic wave, such as a radio wave or laser light, ahead of the own vehicle, and from a reflected wave thereof, detect an object that is present within the predetermined distance D1 ahead of the own vehicle. Examples of the radar sensors include laser radars and millimeter-wave radars.

The forward detection sensor 22 may have the function of the illuminance sensor 21. For example, the forward detection sensor 22 may process an image captured by an image sensor to thereby extract pixels each having a brightness of not lower than a predetermined value and detect the luminance around the vehicle on the basis of the information on the extracted pixels.

The camera sensors detect an object that is present within the predetermined distance D1 ahead of the own vehicle, from an image of an area ahead of the own vehicle. Examples of the camera sensors include CCD (charge coupled device) cameras and CMOS (complementary metal-oxide semiconductor) cameras.

The engine ECU 23 starts/stops an engine according to the on/off state of an ignition switch, for example.

The transmission ECU 24 controls the transmission ratio of the gear in transmitting the power generated by the engine to an output shaft, according to the range that corresponds to the manipulated position of a selector lever. The range include, for example, a parking range used when the vehicle is parked, a reverse range used when the vehicle is moved backward, a neutral range with which no power is transmitted to the output shaft, a drive range used when the vehicle moves forward, i.e. normally traveling, or the like.

The control unit 30 has an illumination control section 31 and a dimming control section 32, for example, as functional configurations. The control unit 30 includes a memory (stopped state storage section) 39 that stores a stopped state of the vehicle. The stopped state of the vehicle includes a state detected by the forward detection sensor 22 at a time point when the vehicle stops its engine.

The state included in the stopped state is not limited to the state detected by the forward detection sensor 22. For example, the stopped state may be stored with inclusion of an illumination state of the headlight 10 when the engine is stopped (e.g., a high-beam state, a low-beam state, a parking-light state, etc.). In this case, the illumination state of the headlight 10 in starting the engine may be controlled according to the illumination state of the headlight 10 at the engine stop.

The illumination control section 31 determines whether the luminance detected by the illuminance sensor 21 is lower than a determination value, which serves as a reference in determining whether to automatically switch on the headlight 10. The illumination control section 31, when determining that the detected luminance is lower than the determination value, switches on the headlight 10. On the other hand, the illumination control section 31, when determining that the detected luminance is not less than the determination value, switches off the headlight 10.

When starting the engine, if the forward detection sensor 22 detects an object within the predetermined distance D1 ahead of the own vehicle, the dimming control section 32 dims the headlight 10. The start of the engine can be determined by a signal being received from the engine ECU 23, the signal indicating that the on state of the ignition switch has been detected. The headlight 10 can be dimmed, for example, by decreasing the illuminance of the headlight 10 (which can include switch-off of the headlight 10), by switching on only the parking light, by switching off some of a plurality of lights, or the like.

Figure 2:
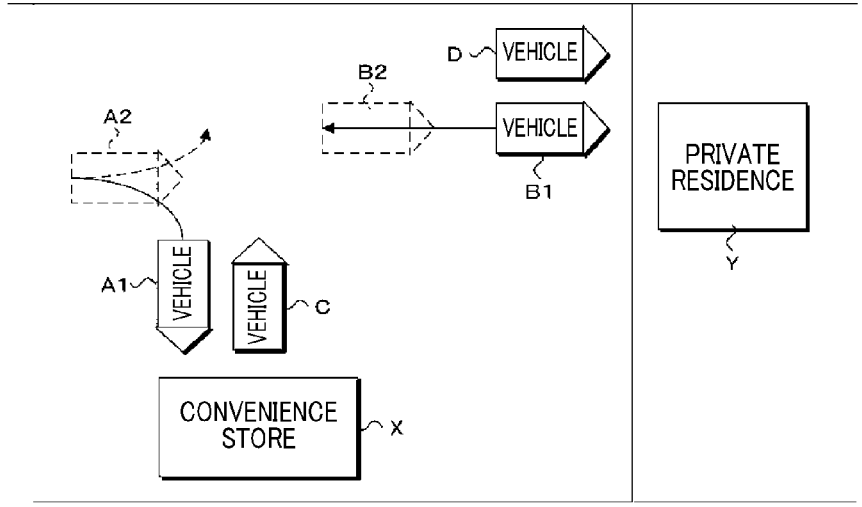
FIG. 2 is a diagram illustrating dimming control of a headlight.

Referring to FIG. 2, dimming control of the headlight will be specifically described. The description is based on a precondition that a vehicle A1, a vehicle B1, a vehicle C, and a vehicle D are parked in a parking area of a convenience store X at nighttime. The vehicle A1 is parked with its front oriented to the convenience store X. Accordingly, when the engine of the vehicle A1 is started, the forward detection sensor 22 detects the convenience store X within the predetermined distance D1 ahead of the vehicle A1, and the dimming control section 32 dims the headlight 10.

The vehicle B1 is parked with its front oriented to a private residence Y. Accordingly, when the engine of the vehicle B1 is started, the forward detection sensor 22 detects the private residence Y within the predetermined distance D1 ahead of the vehicle B1, and the dimming control section 32 dims the headlight 10.

The vehicles C and D are each parked in a site where no object such as a convenience store X or a private residence Y is present ahead of the vehicle. Accordingly, when the engine of each of the vehicles C and D is started, the forward detection sensor 22 detects no object ahead of the vehicle, and hence the dimming control section 32 allows the headlight 10 to illuminate with normal luminance, without dimming the headlight 10.

The forward detection sensor 22 requires some period of time to detect an object, and hence there can be a time difference between the start of the engine and the dimming of the headlight 10. Accordingly, during the period between the start of the engine and the object detection of the forward detection sensor 22, the dimming control section 32 may determine whether an object has been detected, on the basis of the stopped state stored in the memory 39. The object determining function using the stopped state can be optionally set.

After dimming the headlight 10, the dimming control section 32 shown in FIG. 1 cancels the dimming control of the headlight 10 if either of the following conditions (1) and (2) is satisfied.

(1) A condition that the transmission is shifted from the reverse range (R) to the neutral range (N) or the drive range (D). The range to which the transmission has been shifted can be determined by a manipulation signal of the selector lever being received from the transmission ECU 24.

(2) A condition that the distance from the object detected by the forward detection sensor 22 to the vehicle has increased by a predetermined distance D2 or more by the movement of the vehicle. The predetermined distance D2 can be set, for example, to an approximation or more of an outer edge of the illumination range of the headlight 10. The distance D1 used as a reference when the dimming control section 32 dims the headlight 10 may be the same as or different from the distance D2 used as a reference when the dimming control is cancelled.

The conditions based on which the dimming control is cancelled is not limited to the conditions (1) and (2) set forth above. For example, the dimming control may be cancelled if the transmission is shifted to the reverse range.

Referring to FIG. 2, cancellation of the dimming control will be specifically described. As described above, when the engine of the vehicle A1 is started at nighttime, the headlight 10 is dimmed. Afterward, when the vehicle A1 moves backward to a position of a vehicle A2 and the transmission is shifted from the reverse range to the neutral range or the drive range, the dimming control section 32 cancels the dimming control of the headlight 10. In other words, the headlight 10 is illuminated with normal luminance.

When the engine of the vehicle B1 is started at nighttime, the headlight 10 is dimmed. Afterward, when the vehicle B1 moves backward to a position of a vehicle B2 and the distance to the private residence Y has become equal to the predetermined distance D2 or more, the dimming control section 32 cancels the dimming control of the headlight 10. In other words, the headlight 10 is illuminated with normal luminance.

Figure 3:
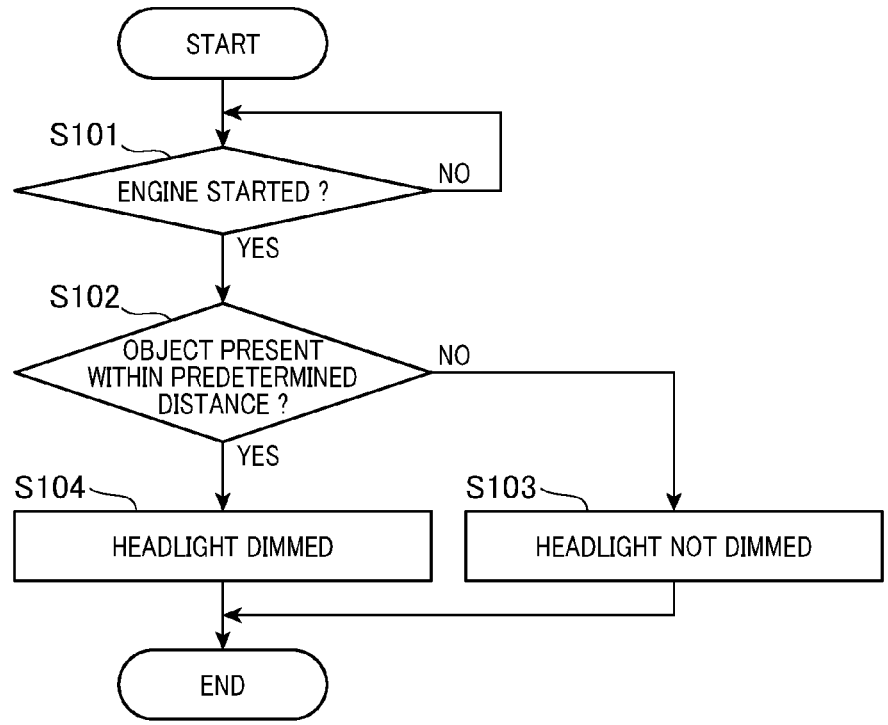
FIG. 3 is a flowchart illustrating a process of dimming control of a headlight.

Referring now to FIG. 3, a dimming control process of the headlight in starting the engine will be described.

First of all, if the dimming control section 32 detects that the engine has been started (YES in step S101), the dimming control section 32 determines whether the forward detection sensor 22 has detected an object within the predetermined distance ahead of the vehicle (step S102). If the determination is NO (NO in step S102), the dimming control section 32 allows the headlight 10 to illuminate with normal luminance, without dimming the headlight 10 (step S103), and terminates the dimming control process.

On the other hand, if an object is determined to have been detected within the predetermined distance ahead of the vehicle in step S102 (YES in step S102), the dimming control section 32 dims the headlight 10 (step S104), and terminates the dimming control process.

Figure 4:
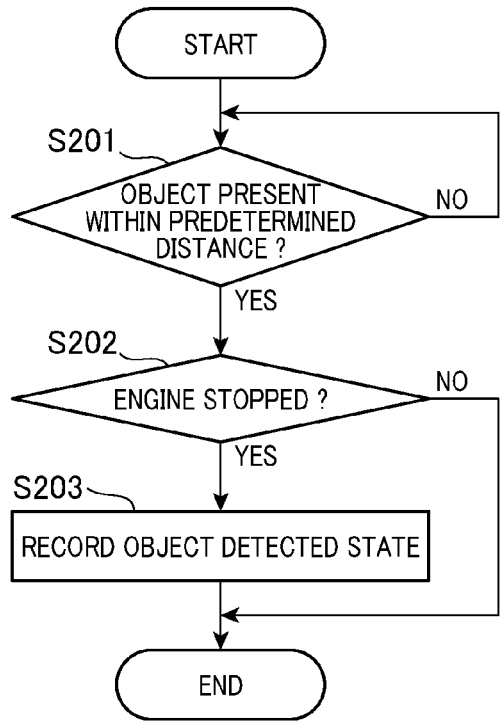
FIG. 4 is a flowchart illustrating a process of storing a stopped state in a memory.
Figure 5:
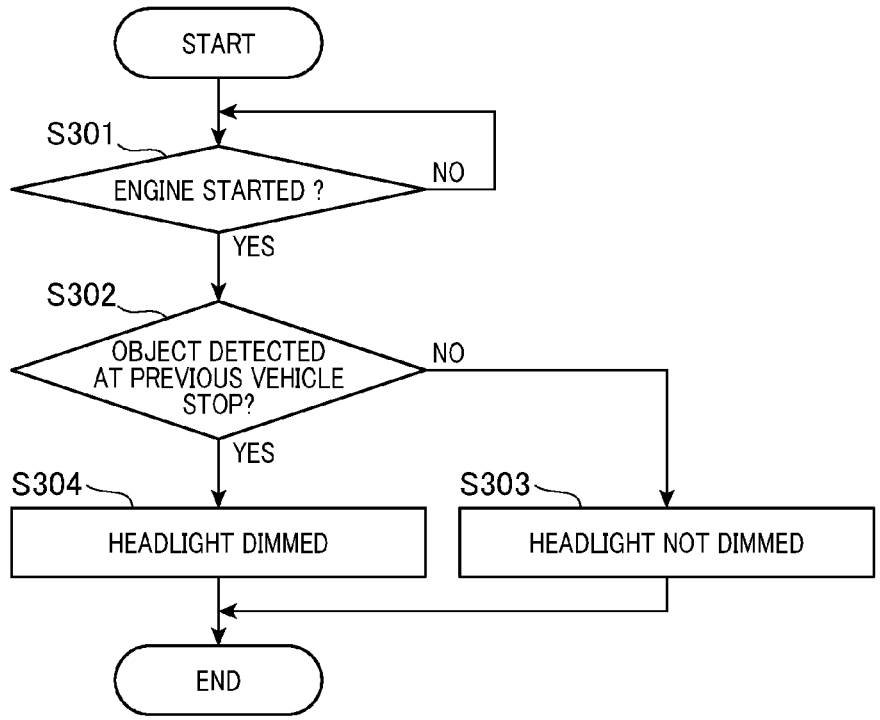
FIG. 5 is a flowchart illustrating a process of dimming control of a headlight on the basis of a stopped state.

Referring to FIGS. 4 and 5, hereinafter will be described the dimming control process in the case of optionally selecting the object determining function that makes use of a stopped state. First, referring to FIG. 4, a process of storing a stopped state in the memory 39 will be described.

First of all, the dimming control section 32 determines whether the forward detection sensor 22 has detected an object within the predetermined distance ahead of the vehicle (step S201). If the determination is YES (YES in step S201), the dimming control section 32 determines whether the engine has been stopped (step S202). If the determination is NO (NO in step S202), the present process is terminated.

On the other hand, if the engine is determined to have been stopped in step S202 above (YES in step S202), the dimming control section 32 stores in the memory 39, at that time point, the state detected by the forward detection sensor 22, as a stopped state (step S203). The present process is then terminated.

Referring to FIG. 5, hereinafter will be described a process of performing dimming control of the headlight on the basis of the stopped state, when starting the engine.

If the dimming control section 32 detects that the engine has been started (YES in step S301), the dimming control section 32 determines whether an object had been detected within the predetermined distance ahead of the vehicle in the previous parking, on the basis of the stopped state stored in the memory 39 (step S302). If the determination is NO (NO in step S302), the dimming control section 32 allows the headlight 10 to illuminate with normal luminance, without dimming the headlight 10 (step S303), and terminates the dimming control process.

On the other hand, if it is determined, in step S302, that an object had been detected within the predetermined distance ahead of the vehicle at the previous parking (YES in step S302), the dimming control section 32 dims the headlight 10 (step S304), and terminates the dimming control process.

Figure 6:
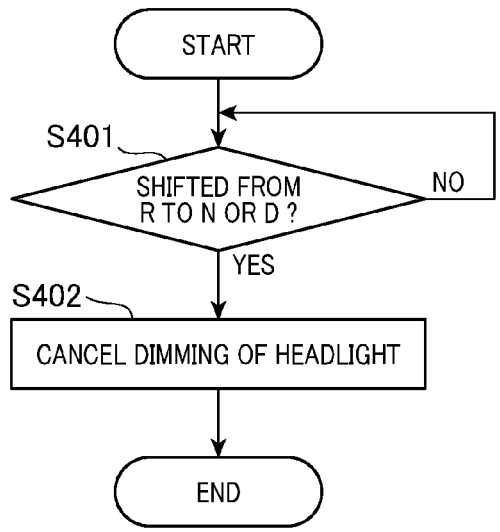
FIG. 6 is a flowchart illustrating a process of cancelling dimming control on the basis of a transmission range.
Figure 7:
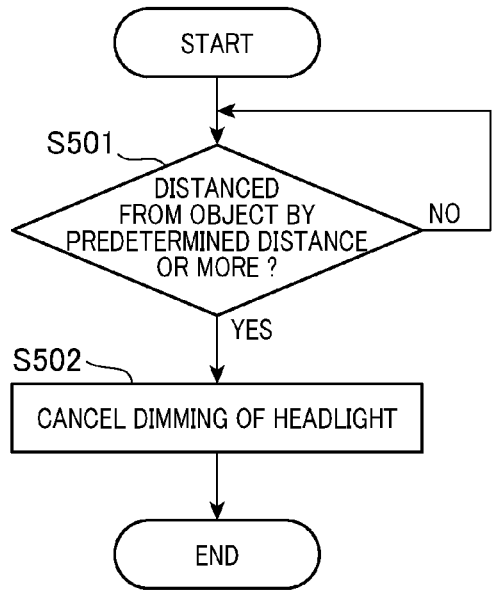
FIG. 7 is a flowchart illustrating a process of cancelling dimming control on the basis of a moving distance of the vehicle.

Referring to FIGS. 6 and 7, a dimming cancellation process of cancelling the dimming control of the headlight will be described. Referring to FIG. 6 first, the description hereinafter sets forth a dimming cancellation process of cancelling dimming when the transmission is shifted from the reverse range to the neutral range or to the drive range.

First of all, the dimming control section 32 determines whether the transmission has been shifted from the reverse range to the neutral range or to the drive range (step S401). If the determination is YES (YES in step S401), the dimming control section 32 cancels the dimming control of the headlight 10, and allows the headlight 10 to illuminate with normal luminance (step S402). The dimming cancellation process is then terminated.

Referring to FIG. 7, the description hereinafter sets forth a dimming cancellation process of cancelling dimming when the distance from the object detected by the forward detection sensor to the vehicle is increased by a predetermined distance or more by the movement of the vehicle.

First of all, the dimming control section 32 determines whether the distance from the object detected by the forward detection sensor 22 to the vehicle has increased by a predetermined distance or more by the movement of the vehicle (step S501). If the determination is YES (YES in step S501), the illumination control section 31 cancels the dimming control of the headlight 10, and allows the headlight 10 to illuminate with normal luminance (step S502). The dimming control process is then terminated.

As described above, according to the headlight control apparatus 1 of the first embodiment, the illuminance sensor 21 detects the luminance around the vehicle, and depending on whether the detected luminance is lower than a determination value, the illumination control section 31 switches on or off the headlight 10. On the other hand, when the engine of the vehicle is started and if the forward detection sensor 22 detects an object within the predetermined distance ahead of the vehicle, the dimming control section 32 dims the headlight 10.

For example, if one gets into a vehicle parked in a parking area at nighttime, and starts the engine to and finds a shop, a private residence, or the like ahead of the vehicle, the headlight 10 is dimmed. Accordingly, the degree of annoyance that would be caused by the glare from the headlight 10 can be reliably reduced.

Moreover, according to the headlight control apparatus 1 of the first embodiment, when the vehicle engine is stopped, a state detected by the forward detection sensor 22 is stored in the memory 39 as a stopped state. Further, when the vehicle engine is started, the stopped state stored in the memory 39 is used as a basis to determine whether an object has been detected, thereby allowing the headlight 10 to be dimmed or illuminated.

In this way, the time difference generated between the start of the engine and the dimming of the headlight 10 can be minimized.

With the headlight control apparatus 1 of the first embodiment, when the transmission of the vehicle is shifted from the reverse range to the neutral range or to the drive range, or when the distance from the object detected by the forward detection sensor 22 to the vehicle is increased by a predetermined distance or more by the movement of the vehicle, the dimming control of the headlight 10 is cancelled.

Therefore, with the headlight control apparatus 1 of the first embodiment, the illumination of the headlight 10 can be reliably controlled in conformity with the conditions around the vehicle to prevent annoyance that would be caused by the illumination of the headlight 10.

Figure 8:
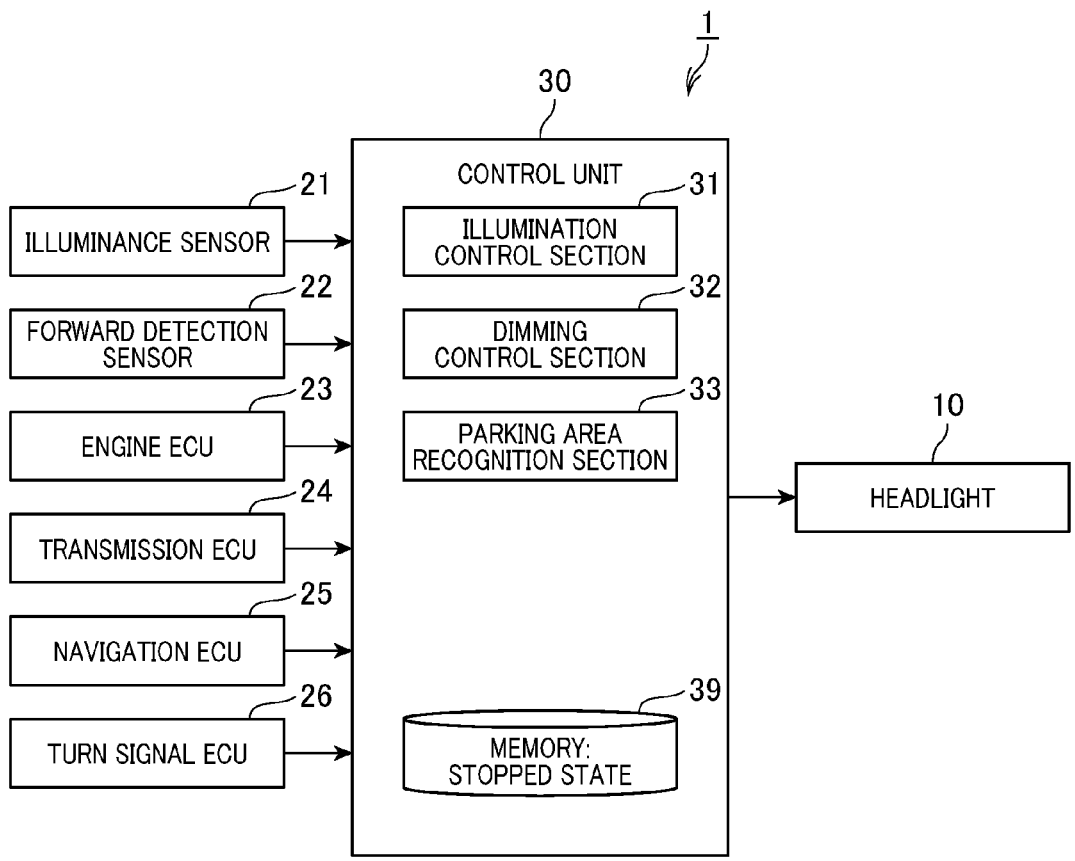
FIG. 8 is a diagram illustrating a configuration of a modification of the headlight control apparatus according to the first embodiment of the present invention.

As shown in FIG. 8, the headlight control apparatus 1 of the first embodiment described above may further include a navigation ECU 25 and a turn signal (direction indicator) ECU 26, and the control unit 30 may further include a parking area recognition section 33. In the following, description will be focused on a configuration different from that of the headlight control apparatus 1 of the first embodiment.

The navigation ECU 25 identifies a current location of the own vehicle using a GPS (global positioning system), a gyro sensor, or the like, and checks the current location against the map information to thereby display the current location in a map on a display screen and guides the driver to the destination along the route.

The turn signal ECU 26 controls blinking or switch-off of a turn signal light that indicates a direction change, according to the driver's manipulation of the turn signal lever.

The parking area recognition section 33 recognizes whether the vehicle has moved to a parking area. Whether the vehicle has moved to a parking area can be recognized, for example, based on the result of the navigation ECU 25 checking the current location of the own vehicle against the map information, the result of the forward detection sensor 22 recognizing a white line on the road, the turn signal ECU 26 issuing a manipulation detection signal of the turn signal lever, or the like.

The vehicle stops in a parking area after being recognized by the parking area recognition section 33 as having moved to the parking area. In this case, the memory 39 stores a stopped state with inclusion of information that the vehicle has been parked in the parking area.

At the start of the engine, the dimming control section 32 dims the headlight 10 if the forward detection sensor 22 detects an object within the predetermined distance D1 ahead of the vehicle, and the stopped state stored in the memory 39 includes the information that the vehicle has been parked in the parking area.

Second Embodiment

Figure 9:
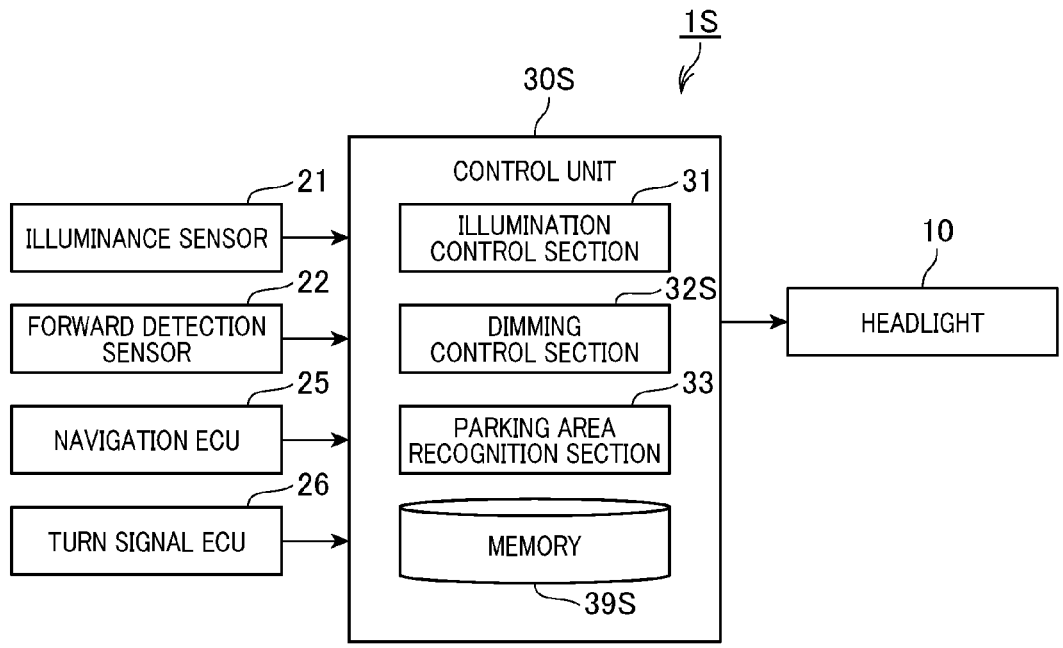
FIG. 9 is a diagram illustrating a configuration of a headlight control apparatus, according to a second embodiment of the present invention.

With reference to FIG. 9, a headlight control apparatus 1S according to a second embodiment of the present invention will be described. The headlight control apparatus 1S differs from the headlight control apparatus 1 of the first embodiment in the following points.

Specifically, the difference lies in that: the headlight control apparatus 1S includes neither the engine ECU 23 nor the transmission ECU 24; the headlight control apparatus 1S includes the navigation ECU 25 and the turn signal ECU 26; it is a control unit 30S that has the parking area recognition section 33; and the stopped state is not stored in a memory 39S of the control unit 30S of the headlight control apparatus 1S. The rest of the configuration is similar to the headlight control apparatus 1.

The navigation ECU 25, the turn signal ECU 26, and the parking area recognition section 33 are configured in the same manner as those of the modification of the headlight control apparatus 1 of the first embodiment. Accordingly, the following description will be focused on a configuration of the headlight control apparatus 1S different from that of the headlight control apparatus 1 of the first embodiment and its modification.

A dimming control section 32S dims the headlight if the parking area recognition section 33 recognizes that the vehicle has moved to a parking area, and the forward detection sensor 22 has detected an object within the predetermined distance D1 ahead of the vehicle.

Figure 10:
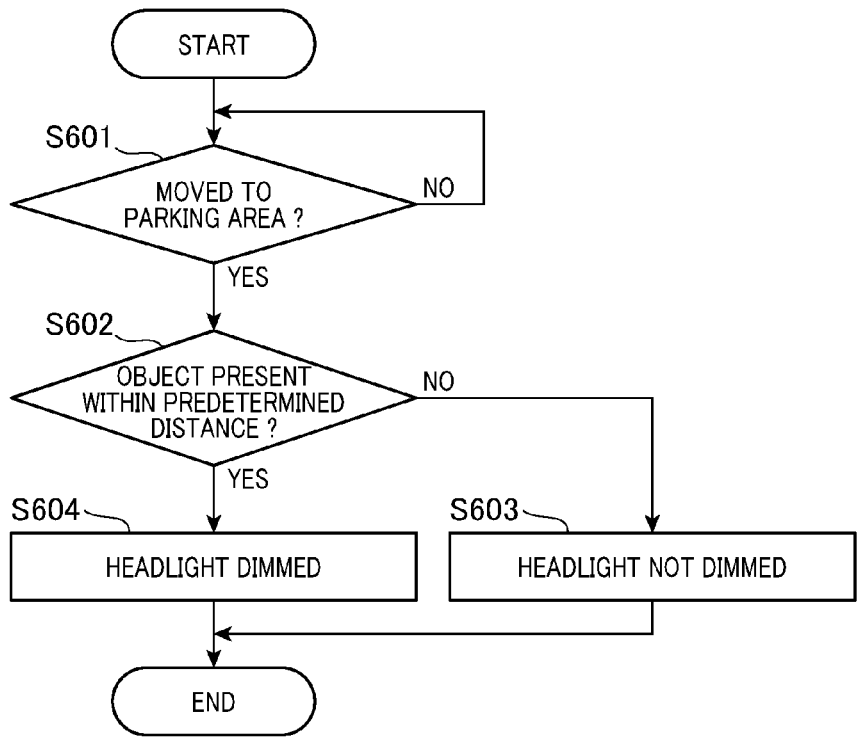
FIG. 10 is a diagram illustrating a process of dimming control of a headlight, according to the second embodiment.

Referring to FIG. 10, description hereinafter sets forth a process in performing the dimming control of the headlight in the headlight control apparatus 1S of the second embodiment.

First of all, if the parking area recognition section 33 recognizes that the vehicle has moved to a parking area (YES in step S601), the dimming control section 32S determines whether the forward detection sensor 22 has detected an object within the predetermined distance ahead of the vehicle (step S602). If the determination is NO (NO at step S602), the dimming control section 32S allows the headlight 10 to illuminate with normal luminance, without dimming the headlight 10 (step S603), and terminates the dimming control process.

On the other hand, if it is determined, in step S602, that an object has been detected within the predetermined distance ahead of the vehicle (YES step S602), the dimming control section 32 dims the headlight 10 (step S604) and terminates the dimming control process.

As described above, with the headlight control apparatus 1S of the second embodiment, the illuminance sensor 21 detects the luminance around the vehicle. Then, depending on whether the detected luminance is lower than a determination value, the illumination control section 31 switches on or off the headlight 10. On the other hand, the dimming control section 32S dims the headlight 10 if the parking area recognition section 33 recognizes that the vehicle has moved to a parking area, and the forward detection sensor 22 has detected an object within the predetermined distance ahead of the vehicle.

Thus, for example, if the vehicle moves to a parking area at nighttime, and a shop, a private residence, or the like is found to be present ahead of the vehicle, the headlight 10 is dimmed. Accordingly, the degree of annoyance that would be caused by the glare from the headlight 10 can be reliably reduced.

Therefore, with the headlight control apparatus 1S of the second embodiment, the illumination of the headlight 10 can be reliably controlled in conformity with the conditions around the vehicle to prevent annoyance that would be caused by the illumination of the headlight 10.

(Modifications)

The foregoing embodiments are merely examples, and should not be construed as excluding various modifications or technical applications that are not specified in the embodiments. In other words, the present invention can be implemented in various modes within a scope not departing from the spirit of the invention. For example, the elements provided to the foregoing embodiments can be combined with each other as long as the combination is technically feasible, and such combinations of the elements are also encompassed in the scope of the present invention as long as the combinations include characteristics of the present invention.

Figure 11:
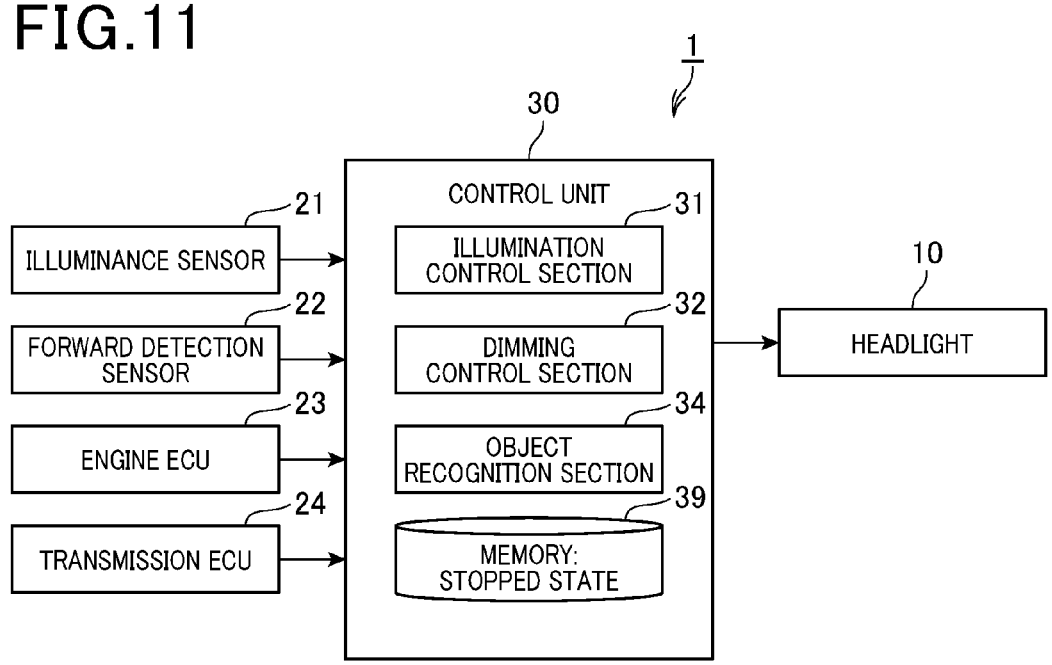
FIG. 11 is a diagram illustrating a configuration of a modification of the headlight control apparatus according to the first embodiment of the present invention.
Figure 12:
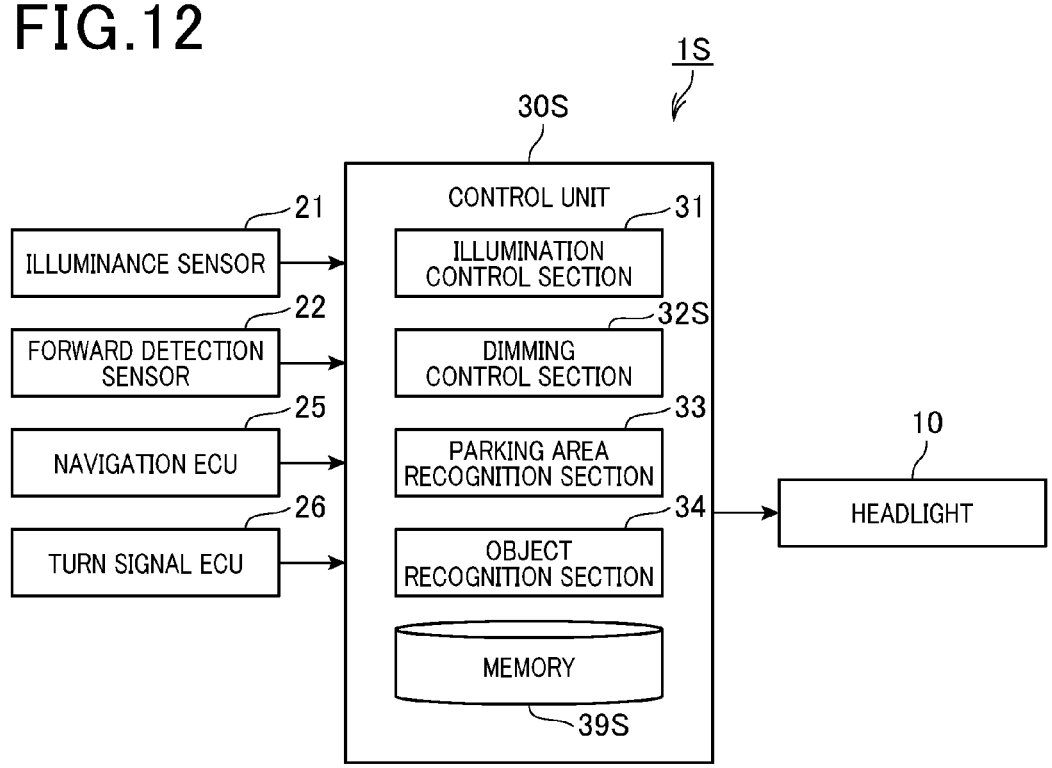
FIG. 12 is a diagram illustrating a configuration of a modification of the headlight control apparatus according to the second embodiment of the present invention.

Moreover, as shown in FIGS. 11 and 12, in the headlight control apparatus 1 of the first embodiment and the headlight control apparatus 1S of the second embodiment described above, the control units 30 and 30S may each be further provided with an object recognition section 34. In the following, description will be focused on a configuration different from that of the headlight control apparatus 1 of the first embodiment and that of the headlight control apparatus 1S of the second embodiment.

The object recognition section 34 recognizes whether an object detected by the camera sensor included in the forward detection sensor 22 is a building, a person, or another vehicle. The building includes, for example, a shop, a private residence, a wall, or the like.

If the object recognition section 34 recognizes that the object is a building, the dimming control section 32 or 32S dims the headlight 10. If the object recognition section 34 recognizes that the object is a person or another vehicle, the dimming control section 32 or 32S allows the headlight 10 to illuminate with normal luminance, without dimming the headlight 10.

Thus, whether to dim the headlight 10 or not can be controlled depending on the type of the object that is present ahead of the vehicle. Accordingly, if the object is of a type requiring mitigation of the glare from the headlight, the headlight 10 is dimmed, and if the object is of a type not requiring mitigation of the glare from the headlight, the headlight 10 is illuminated with normal luminance.

REFERENCE SIGNS LIST 1, 1S: headlight control apparatus, 10: headlight, 21: illuminance sensor, 22: forward detection sensor, 30, 30S: control unit, 31: illumination control section, 32, 32S: dimming control section, 33: parking area recognition section, 34: object recognition section, 39, 39S: memory.

The invention claimed is:

1. A headlight control apparatus that controls an illumination state of a headlight that illuminates an area ahead of a vehicle, comprising:
   an illuminance detecting section that detects luminance around the vehicle;
   an illumination control section that switches on or off the headlight in accordance with the luminance detected by the illuminance detecting section;
   a forward detecting section that detects an object that is present within a predetermined distance ahead of the vehicle;
   a dimming control section that dims the headlight when the forward detecting section detects an object after start of the vehicle; and
   a stopped state storage section that stores a state currently detected by the forward detecting section as a stopped state, when the vehicle stops, wherein:
   after start of the vehicle, the dimming control section determines whether the object has been detected, on the basis of the stopped state stored by the stopped state storage section.

2. The headlight control apparatus according to claim 1, wherein, when a transmission of the vehicle is shifted from a reverse range to a neutral range or to a drive range, the dimming control section cancels dimming control of the headlight.

3. The headlight control apparatus according to claim 1, wherein, when a distance from the object detected by the forward detecting section to the vehicle is increased by a predetermined distance or more by movement of the vehicle, the dimming control section cancels dimming control of the headlight.

4. The headlight control apparatus according to claim 1, further comprising an object recognition section that recognizes whether the object detected by the forward detecting section is a building, a person, or another vehicle, wherein:
   when the object recognition section recognizes that the object is a building, the dimming control section dims the headlight, and when the object recognition section recognizes that the object is a person or another vehicle, the dimming control section does not dim the headlight.

5. A headlight control apparatus that controls an illumination state of a headlight that illuminates an area ahead of a vehicle, comprising:
   an illuminance detecting section that detects luminance around the vehicle;
   an illumination control section that switches on or off the headlight in accordance with the luminance detected by the illuminance detecting section;
   a forward detecting section that detects an object that is present within a predetermined distance ahead of the vehicle;

a parking area recognition section that recognizes whether the vehicle has moved to a parking area; and a dimming control section that dims the headlight when the parking area recognition section recognizes that the vehicle has moved to the parking area, and the forward detecting section has detected the object.

6. The headlight control apparatus according to claim 5, further comprising an object recognition section that recognizes whether the object detected by the forward detecting section is a building, a person, or another vehicle, wherein:

when the object recognition section recognizes that the object is a building, the dimming control section dims the headlight, and when the object recognition section recognizes that the object is a person or another vehicle, the dimming control section does not dim the headlight.

7. A headlight control apparatus that controls an illumination state of a headlight that illuminates an area ahead of a vehicle, comprising:

an illuminance detecting section that detects luminance around the vehicle;

an illumination control section that switches on or off the headlight in accordance with the luminance detected by the illuminance detecting section;

a forward detecting section that detects an object that is present within a predetermined distance ahead of the vehicle; and a dimming control section that dims the headlight when the forward detecting section detects an object after start of the vehicle, wherein:

when a transmission of the vehicle is shifted from a reverse range to a neutral range or to a drive range, the dimming control section cancels dimming control of the headlight.

8. A headlight control apparatus that controls an illumination state of a headlight that illuminates an area ahead of a vehicle, comprising:

an illuminance detecting section that detects luminance around the vehicle;

an illumination control section that switches on or off the headlight in accordance with the luminance detected by the illuminance detecting section;

a forward detecting section that detects an object that is present within a predetermined distance ahead of the vehicle;

a dimming control section that dims the headlight when the forward detecting section detects an object after start of the vehicle;

a stopped state storage section that stores a state currently detected by the forward detecting section as a stopped state, when the vehicle stops; and a parking area recognition section that recognizes whether the vehicle has moved to a parking area, wherein:

after start of the vehicle, the dimming control section determines whether the object has been detected, on the basis of the stopped state stored by the stopped state storage section;

when the vehicle recognized by the parking area recognition section as having moved to the parking area stops, the stopped state storage section stores the stopped state with inclusion that the vehicle has been parked in the parking area; and when the forward detecting section detects the object after start of the vehicle, and when the stopped state stored by the stopped state storage section includes that the vehicle has been parked in the parking area, the dimming control section dims the headlight.

* * * * *